United States Patent
Dembowsky et al.

(10) Patent No.: US 6,206,604 B1
(45) Date of Patent: Mar. 27, 2001

(54) PLUG-IN COUPLING

(75) Inventors: Hans-Joachim Dembowsky, Hamburg; Herbert Fangmann, Lohne; Peter Hauck, Sesslach; Rainer Süssenbach, Steinhagen, all of (DE)

(73) Assignee: Bollhoff GmbH (DE)

( * ) Notice: Subject to any disclaimer, the term of this patent is extended or adjusted under 35 U.S.C. 154(b) by 0 days.

(21) Appl. No.: 09/151,074

(22) Filed: Sep. 10, 1998

(30) Foreign Application Priority Data

Sep. 12, 1997 (DE) .................................. 197 40 165
Aug. 10, 1998 (DE) .................................. 198 36 108

(51) Int. Cl.⁷ ........................ F16C 11/00; F16D 1/12
(52) U.S. Cl. .................... 403/135; 403/132; 403/134; 403/122; 403/143; 403/4
(58) Field of Search .................... 403/122, 132, 403/134, 135, 140, 143, 142, 76, 326, 3, 4

(56) References Cited

U.S. PATENT DOCUMENTS

| 4,904,107 | * | 2/1990 | Fukukawa et al. | 403/122 |
| 5,409,320 | * | 4/1995 | Maury et al. | 403/122 X |
| 5,615,967 | * | 4/1997 | Hellon | 403/133 |
| 5,743,669 | * | 4/1998 | Fujita et al. | 403/131 |
| 5,876,148 | * | 3/1999 | Kraps | 403/119 |

FOREIGN PATENT DOCUMENTS

| 3242573 C2 | | 4/1985 | (DE) . | |
| 41366 | * | 5/1925 | (DK) | 403/140 |
| 0 098 131 | | 1/1984 | (EP) . | |

OTHER PUBLICATIONS

Copy of German Search Report dated Feb. 5, 1998 (3 pages).

* cited by examiner

Primary Examiner—Lynne H. Browne
Assistant Examiner—Ernesto Garcia
(74) Attorney, Agent, or Firm—Harness, Dickey & Pierce, P.L.C.

(57) ABSTRACT

A plug-in coupling having vibration damping characteristics. An elastomeric insert member comprising a ball-shaped female part is inserted into a socket integral with a member so as to be positively retained therein. The plug-in coupling can be easily assembled and disassembled.

20 Claims, 3 Drawing Sheets

PLUG-IN COUPLING

BACKGROUND OF THE INVENTION

The present invention relates to a plug-in coupling for mounting a member to projection means provided with a ball-shaped bead adapted to be inserted into a female part by a snapping action. More particularly the invention relates to a plug-in coupling for mounting a cover to a bolt.

Plug-in couplings comprising a ball-shaped male part and a ball-shaped female part to be connected by a snapping action are known in the prior art. Such plug-in couplings are adapted to removably mount one member to another member.

SUMMARY OF THE INVENTION

It is an object of the present invention to provide a plug-in coupling to be coupled by a snapping action and adapted to dampen vibrations.

To this end the present invention provides a plug-in coupling wherein said female part is formed as an elastomeric, deformable and cup-shaped insert member adapted to be inserted into a socket provided at said member so as to be positively retained within said socket.

The resilient insert member of the present invention provides for vibration dampening characteristics. The insert member is made of rubber or elastomeric plastics and is relatively soft and resiliently deformable to be inserted into a socket. Within the insert member there is provided the ball-shaped female part into which the ball-shaped male part of an other member may be inserted. The cross section of said insert member is designed so as to provide, together with the resilient material for excellent vibration absorbing characteristics. Furthermore, stiffening means are provided to this end.

On the other hand the resilient insert member is positively retained within the socket and this provides for secure retention thereof and allows for disassembly of the plug-in coupling without removal of the insert member from the socket. Assembly of the insert member may be performed by sliding the insert member into a the socket in lateral or axial directions with respect to a longitudinal axis of the plug-in coupling.

Accordingly the present invention provides a plug-in coupling between two members, which is protected from chattering, which is adapted to dampen vibrations, and which can be readily assembled. Furthermore, the plug-in coupling may be readily mounted to the underside of a member. Assembly from below allows to provide for a closed top surface as is desired for example with motor covers.

BRIEF DESCRIPTION OF THE DRAWINGS

A preferred embodiment of the invention will be described with reference to the accompanying drawings wherein.

DETAILED DESCRIPTION OF THE PREFERRED EMBODIMENT

Figure 1:
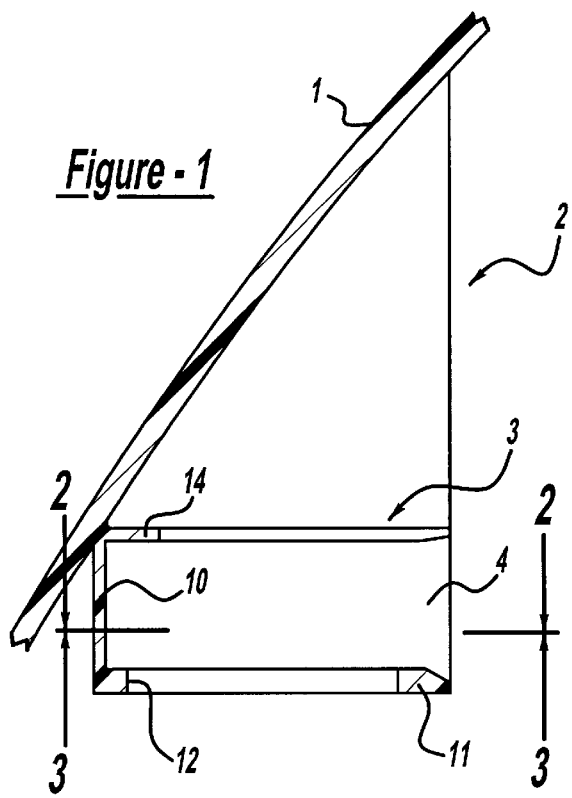
FIG. 1 is a partial sectional view of a socket integral with a motor cover.
Figure 4:
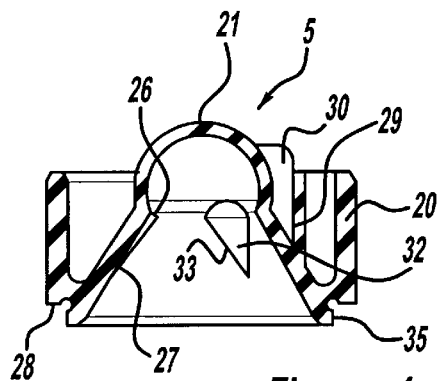
FIG. 4 is a longitudinal cross section of an elastomeric insert member.
Figure 7:
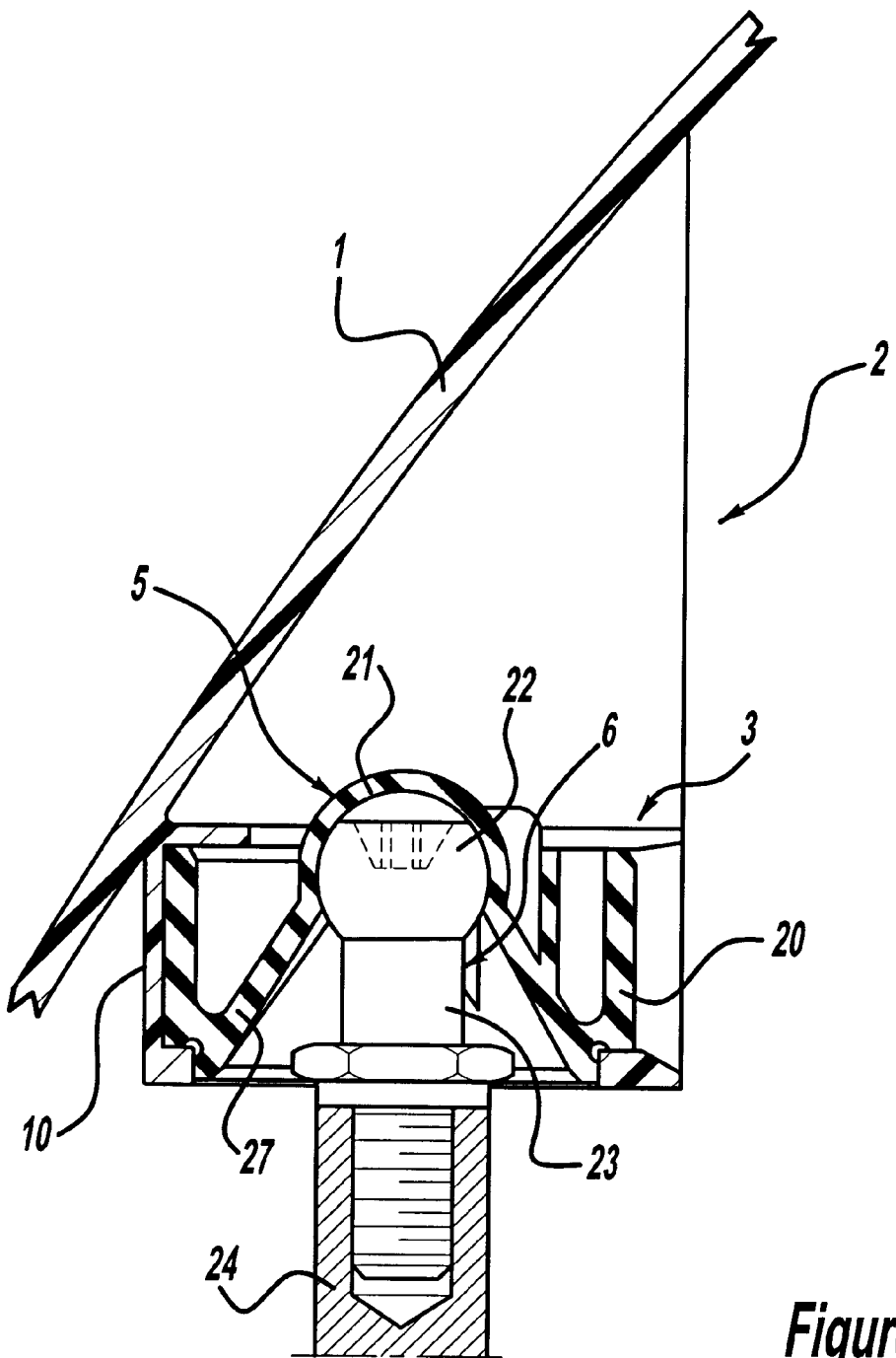
FIG. 7 is a partial sectional view of the assembled plug-in coupling.
Figure 10:
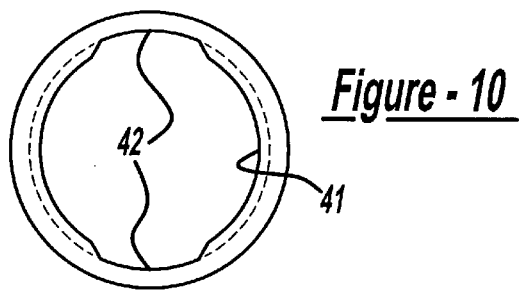
FIG. 10 is a bottom view of the socket of FIG. 8.
Figure 8:
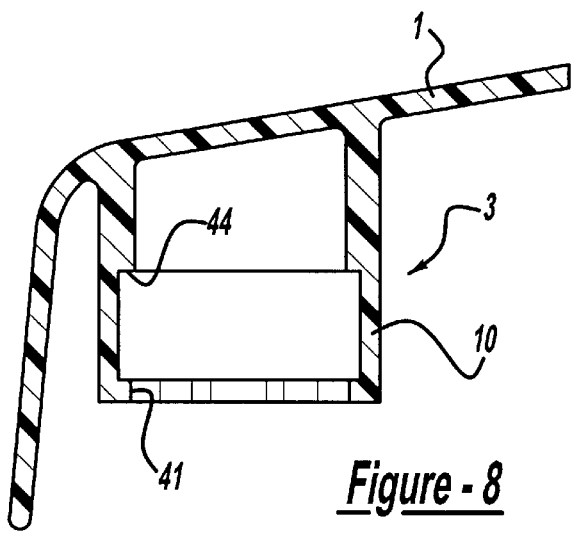
FIG. 8 is a partial sectional view similar to FIG. 1 of a socket of a modified embodiment of a plug-in coupling.
Figure 9:
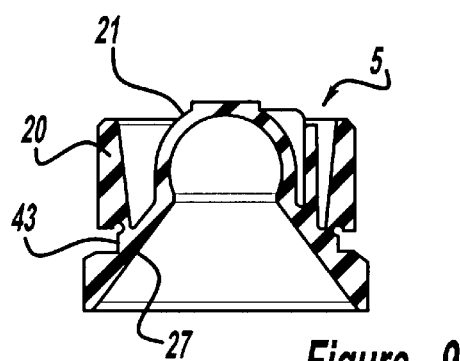
FIG. 9 is a longitudinal cross-section similar to FIG. 4 of the modified insert member.
Figure 12:
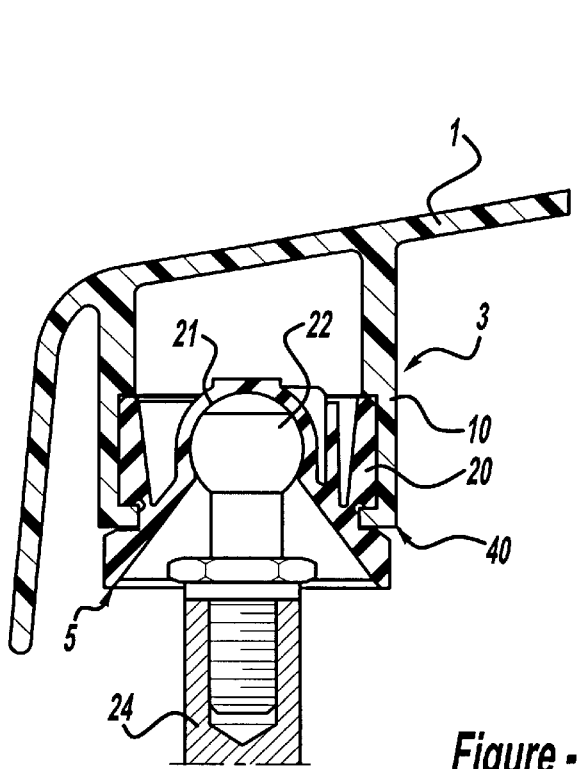
FIG. 12 is a partial sectional view similar to FIG. 7 of the modified embodiment of the plug-in coupling.
Figure 11:
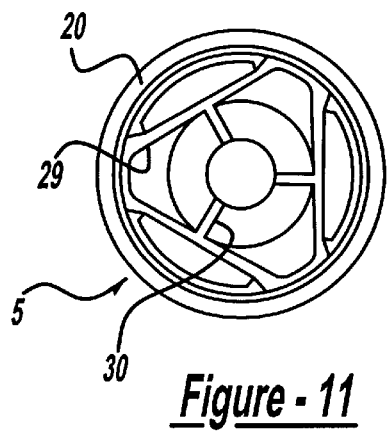
FIG. 11 is an elevational view similar to FIG. 5 of the modified insert member of FIG. 9.

FIG. 1 shows a portion of a motor cover 1, in particular the rim of an otherwise not shown cover, including at its underside an integral dome 2 the lower portion of which comprises a socket 3 of horseshoe shape. The socket 3 includes a lateral opening 4 adapted to receive an elastomeric insert member 5 which is shown in FIG. 4. FIG. 7 shows the elastomeric insert member 5 received in socket 3 to be assembled with a bolt 23 by snapping means. This will be explained in more detail in the following.

Figure 2:
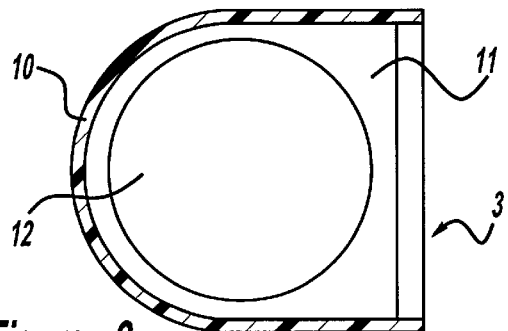
FIG. 2 is a sectional view of the socket in the direction of arrows 2—2 in FIG. 1.
Figure 3:
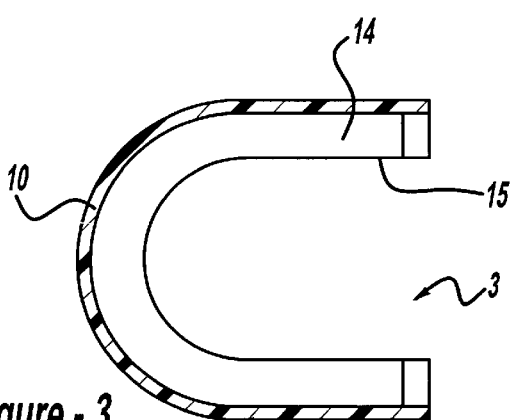
FIG. 3 is a sectional view of the socket in the direction of arrows 3—3 in FIG. 1.

As shown in FIGS. 1 to 3 the socket 3 comprises a peripheral wall 10, a bottom flange 11 having a circular opening 12, and an upper flange 14 which is laterally open at 15 as shown in FIG. 3. The cover 1 including the dome 2 and the socket 3 are integrally formed of a plastic material.

The insert member 5 includes a cylindrical outer wall 20 the height of which corresponds to the internal spacing between the bottom flange 11 and the upper flange 14. Within the cylindrical wall 20 there is provided a ball-shaped female part 21 adapted to receive a ball-shaped head 22 of a bolt 23 (FIG. 7) which is threadably engaged within a casing 24 to which the member 1 is to be mounted. Instead of using a conventional treaded connection between bolt 23 and casing 24 a bolt provided with thread cutting teeth or a bolt fixed to the casing 24 by a screw may be used. The female part 21 has an undercut at 26, and a conical guide portion 27 is provided to resiliently connect the female part 21 to the lower rim 28 of the cylindrical wall 20. The above-mentioned vibration dampening characteristics result substantially from the elastomeric nature and the resiliency of the guide portion 27 between the outer wall 20, the female part 21 and stiffening means to be described.

Figure 5:
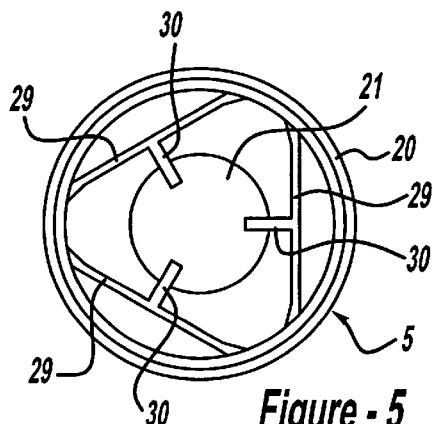
FIG. 5 is an elevational view from above of the insert member of FIG. 4.

As an additional support of the female part 21 there are provided stiffening cordal webs 29 integrally formed with the outer wall 20 as may be clearly seen in FIG. 5. The webs 29 each are provided at their center with a radial rib 30 integral with the outer surface of the female part 21 so as to provide for radial support. In FIG. 5 three webs 29 each are provided with one rib 39. These stiffening means provide for dampening in all directions.

Figure 6:
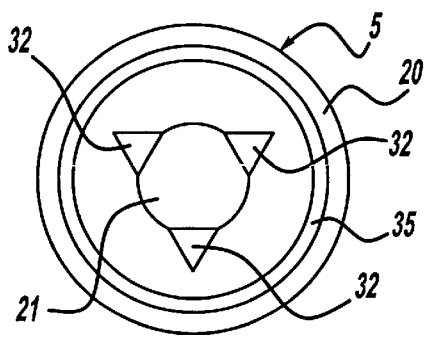
FIG. 6 is a view of the insert member from below.

Furthermore, in the area of undercut 26 the female part 21 includes a plurality of projections 32 at the inner surface of the guide portion 27. The projections 32 have tapered ramps 33 along which the ball-shaped head 22 slides during assembly so that the projections 33 yield and the head 22 snaps into the female part 21 wherein it is retained by the upper surfaces of the projections 32. The projections 32 are clearly shown in FIG. 6. A lower 35 extends from the guide portion 37.

During assembly of the above described plug-in coupling the elastomeric insert member 5 is slided laterally through the opening 4 into the socket 3 by manually deforming the relatively soft insert member 5 sufficiently so that the lower edge 35 enters into the opening 12 of the bottom flange 11. While the insert member may be easily inserted, the insert member when assembled provides for substantial retaining forces in an axial direction. The insert member 5 is retained by the top flange 14 and the bottom flange 11 in the longitudinal direction of the plug-in coupling. In a lateral direction the cylindrical outer wall 20 engages the semi-cylindrical peripheral wall 10 of the socket so that the resilient peripheral wall 20 is sufficiently supported.

FIG. 7 shows the plug-in coupling in the assembled condition when the cover 1 with the resilient insert member 3 is snapped upon the bolt 23. The plug-in coupling is free from vibrations, chattering and noises and may be readily and easily ssembled so as to eliminate threads at the member 1 and to enable the member 1 to be provided with smooth outer surfaces.

FIGS. 8 to 12 show a modified embodiment of the plug-in coupling. Similar components of tee two embodiments have been designated by the same reference numerals, and the description of the second embodiment is limited to structure which is different from that of the first embodiment. The basic difference between the two embodiments is that the insert member 5 of the second embodiment is insertable into the socket 3 not in a lateral direction but rather in an axial direction and that positive retention of the insert member within the socket is obtained by a snap-in connection (see FIG. 12).

To this end the socket 3 has a cylindrical wall 10 integral with member 1 and having a radially inwards projecting peripheral rim 41 at its (in FIG. 8) lower open end. The peripheral rim 41 is recessed or interrupted at two diametrically opposite areas 42 as may be seen in FIG. 10.

The insert member 5 is provided with an annular groove 43 at the area where the cylindrical wall merges into the guide portion 27; the annular groove 43 forms together with the peripheral rim 40 the snap-in connection 40. The insert member 5 is resiliently deformably such that it may be manually (i.e. by the thumb and a further finger of a hand) compressed radially sufficiently to allow for the insert member 5 to be slided axially into the socket 3. The cylindrical wall 10 of the socket 3 is recessed at its inner side such as to form a shoulder 44 (see FIG. 8) which is engaged by the cylindrical wall 20 of the insert member 5 when it is axially slided into the socket. The peripheral rim 41 then snaps into the annular groove 43 so that the insert member 5 is positively retained in the socket 3 by the snap-in connection 40.

What is claimed is:

1. A plug-in coupling for releasably mounting a first member to a second member, the coupling including a projection having a ball-shaped head and being interconnectable with the first member; and an insert member; said projection further being insertable into said insert member which said insert member is insertable into a socket at said second member by a snap-in action, said insert member being elastomeric and deformable, said insert member including a cup-shaped female portion insertable into said socket provided at said second member so as to be positively retained in said socket, said insert member further including a cylindrical outer wall adapted to engage a wall of said socket, and said cup-shaped female portion being connected to said cylindrical outer wall by a conical guide portion, and wherein said insert member includes a gap between said cylindrical outer wall and said female portion and said gap includes cordal webs therein including radial ribs as stiffening means which the female portion is supported against and which are arranged to dampen vibrations in all directions.

2. A plug-in coupling for releasably mounting a first member to a second member, the coupling including a projection having a ball-shaped head and being interconnectable with the first member; and an insert member; said projection further being insertable into said insert member which said insert member is insertable into a socket at said second member by a snap-in action, said insert member being elastomeric and deformable, said insert member including being cup-shaped female portion insertable into said socket provided at said second member so as to be positively retained in said socket, said insert member being insertable axially into said socket, said insert member being positively retained in said socket by a snap-in action when said insert member is being inserted into said socket, and said socket including a cylindrical wall having, at an open end thereof, a radially inwards extending circumferential rim, and said insert member including an annular groove for snap-in receipt of said circumferential rim.

3. A plug-in coupling as defined in claim 2, wherein said circumferential rim of said socket is recessed at two diametrically opposite areas such that radial deformation of said insert member which is provided with said cylindrical wall allows insertion of said insert member axially into said socket.

4. A plug-in coupling for releasably coupling a first member and a second member, said plug-in coupling comprising:
   a projection fixedly attachable to said first member and including a ball-shaped head, and
   a socket attachable to said second member, and
   an insert member positively retained in said socket and including:
      a cup-shaped female portion which is deformable so as to snappingly receive said ball-shaped head,
      a conical guide portion integral with said female portion, and
      a cylindrical outer wall integral with said conical guide portion such that there is a gap between said cylindrical outer wall and said female portion, said gap further extending between said cylindrical outer wall and at least a part of said conical guide portion.

5. A plug-in coupling as defined in claim 4, wherein said cylindrical outer wall engages a wall of said socket.

6. A plug-in coupling as defined in claim 4, wherein said insert member is provided with stiffening means.

7. A plug-in coupling as defined in claim 6, wherein said stiffening means comprise cordal webs and radial ribs disposed in said gap so as to dampen vibrations in all directions.

8. A plug-in coupling as defined in claim 4, wherein said conical guide portion includes a plurality of projections which resiliently deflect when the said female portion snappingly receives said ball-shaped head so as to securingly hold it in said female portion.

9. A plug-in coupling as defined in claim 4, wherein said female portion is provided with an undercut.

10. A plug-in coupling as defined in claim 4, wherein said insert member is provided with a rim engaged within a circular opening in a bottom flange of said socket.

11. A plug-in coupling as defined in claim 4, wherein said socket includes an integral dome.

12. A plug-in coupling as defined in claim 4, wherein said socket is attachable to the second member by integrally forming said socket with the second member.

13. A plug-in coupling as defined in claim 4, wherein said insert member is integrally formed of an elastomeric material or rubber.

14. A plug-in coupling as defined in claim 4, wherein said insert member is arranged to be inserted laterally into said socket.

15. A plug-in coupling as defined in claim 4, wherein said insert member is positively retained within said socket by upper and lower flanges in a longitudinal direction of said plug-in coupling.

16. A plug-in coupling as defined in claim 4, wherein said socket is arranged to be inserted axially into said insert member.

17. A plug-in coupling as defined in claim 16, wherein said insert member is positively retained in said socket by a snap-in connection.

18. A plug-in coupling as defined in claim 17, wherein said socket includes a cylindrical socket wall having, at an open end thereof, a radially inwards extending circumferential peripheral rim arranged to snap into an annular groove of said insert member.

19. A plug-in coupling as defined in claim 18, wherein said peripheral rim of said cylindrical socket wall is recessed at two diametrically opposite areas such that said cylindrical outer wall of said insert member radially deforms in order to allow said insert member to be inserted axially into said cylindrical socket wall.

20. A plug-in coupling according to claim 4, wherein said projection is attachable to the first member by integrally forming said projection with said first member.

* * * * *